United States Patent [19]

Tsutsumi et al.

[11] Patent Number: 5,087,644
[45] Date of Patent: Feb. 11, 1992

[54] CARBON-FIBER-REINFORCED POLYIMIDE RESIN COMPOSITIONS

[75] Inventors: Toshihiko Tsutsumi; Toshiyuki Nakakura, both of Yokohama; Shuichi Morikawa, Kanagawa; Nobuhito Koga, Yokohama, all of Japan

[73] Assignee: Mitsui Toatsu Chemicals, Inc., Tokyo, Japan

[21] Appl. No.: 480,631

[22] Filed: Feb. 15, 1990

[30] Foreign Application Priority Data

Feb. 21, 1989 [JP] Japan .................. 1-039414
Mar. 17, 1989 [JP] Japan .................. 1-063598

[51] Int. Cl.$^5$ .................. C08K 9/00
[52] U.S. Cl. .................. 523/205
[58] Field of Search .................. 523/205

[56] References Cited

U.S. PATENT DOCUMENTS

| | | | |
|---|---|---|---|
| 4,340,697 | 7/1982 | Aya et al. | 525/420 |
| 4,664,768 | 5/1987 | Scala et al. | 428/408 |
| 4,931,531 | 6/1990 | Tamai et al. | 528/172 |
| 4,943,594 | 7/1990 | Ezawa et al. | 521/79 |
| 4,978,692 | 12/1990 | Ezawa et al. | 521/185 |

FOREIGN PATENT DOCUMENTS 8905373 4/1989 World Int. Prop. O.

*Primary Examiner*—Kriellion S. Morgan
*Assistant Examiner*—V. K. Rajguru
*Attorney, Agent, or Firm*—Burns, Doane, Swecker & Mathis

[57] ABSTRACT

Provided are carbon-fiber-reinforced polyimide resin compositions having excellent mechanical strength. The compositions are formed of (a) 5-50 parts by weight of carbon fibers, which have been obtained by coating starting carbon fibers at surfaces thereof with an aromatic polysulfone resin and then heating the thus-coated carbon fibers at 300°–400° C., and (b) 95-50 parts by weight of a polyimide resin which perferably have recurring units of following formula:

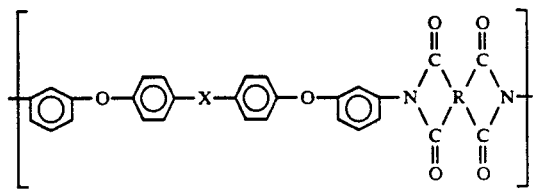

or

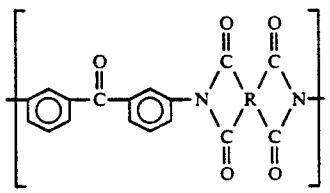

wherein X represents a specific divalent radical and R represents a particular tetra-valent radical.

7 Claims, No Drawings

CARBON-FIBER-REINFORCED POLYIMIDE RESIN COMPOSITIONS

BACKGROUND OF THE INVENTION a) Field of the Invention

The present invention relates to carbon-fiber-reinforced polyimide resin compositions having excellent mechanical strength.

b) Description of the Related Art

Thermoplastic polyimide resins led by "Ultem" (trade mark; product of General Electric Company) are superior in heat resistance and mechanical strength to general-purpose engineering plastics and are hence called "super engineering plastics". Their application is now widely being investigated for electric and electronic equipment and appliances, machinery, cars and the like.

With the recent advancement of technology, there is an increasing demand for novel thermoplastic polyimide resins having heat resistance and mechanical characteristics comparable with or better than "Ultem".

For example, U.S. Pat. No. 4,847,349 discloses a process for producing a polyimide resin by reacting an ether diamine with a tetracarboxylic dianhydride. Further, the production of a polyimide resin by the reaction of 3,3'-diaminobenzophenone and a tetracarboxylic dianhydride is also disclosed in Japanese Patent Application No. 167392/1989, etc. These related pieces of art have both furnished novel polyimide resins which have heat resistance and mechanical characteristics not available in the past.

With a view to further improving characteristics of these polyimide resins, especially their mechanical strength, a fibrous reinforcing material, typically carbon fibers is generally incorporated. However, an epoxy resin is usually employed as a binder for carbon fibers because carbon fibers are often used in carbon-fiber-reinforced plastics formed of an epoxy resin as a matrix. The epoxy resin binder is therefore effective where a thermosetting resin such as an epoxy resin is used as a matrix. The epoxy resin binder however has poor adhesion to polyimide resins so that the epoxy resin binder cannot provide resin compositions having good mechanical strength. It may be contemplated to use a polyamide resin as a binder for carbon fibers as disclosed in Japanese Patent Application Laid-Open No. 106752/1978. A high temperature of at least 300° C. is generally required to mold or otherwise form a polyimide resin. The binder may hence undergo thermal decomposition during the molding, thereby causing problems such as the formation of voids and strength reduction at welded portions.

Further, as disclosed in Japanese Patent Application Laid-Open No. 120730/1981, it may also be contemplated to use carbon fibers bound with an aromatic polysulfone resin. However, this method has still not fully satisfied the required characteristics.

SUMMARY OF THE INVENTION

An object of the invention is to provide a carbon-fiber-reinforced polyimide resin composition excellent in mechanical strength such as tensile strength.

Another object of the invention is to provide a carbon-fiber-reinforced polyimide resin composition suitable for molding by injection molding or the like.

The above objects of the invention can be attained by the provision of a carbon-fiber-reinforced polyimide resin composition which comprises 5-50 parts by weight of carbon fibers obtained by coating starting carbon fibers at surfaces thereof with an aromatic polysulfone resin and then heating the thus-coated carbon fibers at 300°-400° C. and 95-50 parts by weight of a polyimide resin.

The polyimide resin usable in the invention may be selected from thermoplastic polyimide resins having recurring units of the following formula (I) or (II):

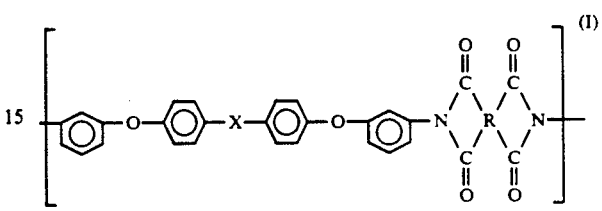

or

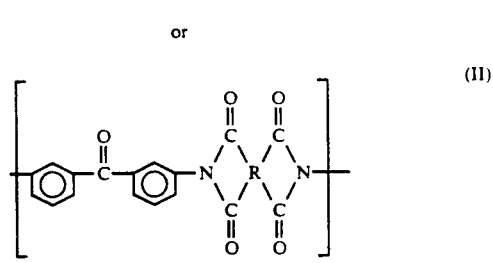

wherein X is a radical selected from the group consisting of a direct bond, divalent hydrocarbon having 1 to 10 carbons, hexafluorinated isopropylidene, carbonyl, thio, sulfinyl, sulfonyl and oxide, and R is a tetra-valent radical selected from the group consisting of aliphatic radical having 2 and more carbons, cyclo-aliphatic radical, monoaromatic radical, condensed polyaromatic radical, and noncondensed polyaromatic radical wherein aromatic radicals are mutually connected with a bond or a crosslinking function.

The logarithmic viscosities of the polyimide resin represented by the formula (I) are generally in a range of 0.20–0.70 dl/g, with a range of 0.30–60 dl/g being preferred. Logarithmic viscosities lower than 0.20 dl/g make it difficult to obtain desired mechanical characteristics, while logarithmic viscosities higher than 0.70 dl/g result in higher melt viscosities and hence poorer moldability. Further, the logarithmic viscosity of the polyimide resin represented by the formula (II) is generally in a range of 0.25–0.75 dl/g, with a range of 0.35–0.65 being preferred. Logarithmic viscosities lower than 0.25 dl/g make it difficult to obtain desired mechanical characteristics, while logarithmic viscosities higher than 0.75 dl/g result in higher melt viscosities and hence poorer moldability. Each logarithmic viscosity referred to herein is the value obtained by dissolving under heat the corresponding resin at a concentration of 0.5 g/100 ml in a mixed solvent of para-chlorophenol and phenol (weight ratio: 90/10), cooling the resultant solution to 35° C. and then measuring the solution thus cooled.

The polyimides resins represented by formula (I) are each obtained by using an ether diamine represented by the below-described formula (III). Namely, they are polyimides, each of which can be synthesized by dehydrating and cyclizing the ether diamine and at least one tetracarboxylic dianhydride represented by the below-described formula (IV). Described specifically, they can be easily prepared by the process disclosed in U.S. Pat. No. 4,847,349.

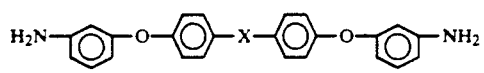

wherein X has the same meaning as defined above.

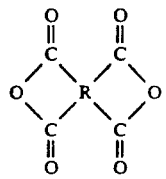

wherein R has the same meaning as defined above.

Illustrative of the ether diamine of the formula (III) useful in the practice of the above process include 4,4'-bis[4-(3-aminophenoxy)phenyl]sulfide, 4,4'-bis[4-(3-aminophenoxy)phenyl]sulfone, 4,4'-bis(3-aminophenoxy)-benzophenone, 4,4'-bis(3-aminophenoxy)biphenyl, bis[4-(3-aminophenoxy)phenyl]methane, 1,1-bis[4-(3-aminophenoxy)-phenyl]ethane, 2,2-bis[4-(3-aminophenoxy)phenyl]propane, 2,2-bis[4-(3-aminophenoxy)phenyl]butane, 2,2-bis[4-(3-aminophenoxy)phenyl]-1,1,1,3,3,3-hexafluoropropane, and bis[4-(3-aminophenoxy)phenyl]ketone. They can be used either singly or in combination.

One or more diamines can be used in combination to an extent not impairing the melt flowability of the above-described thermoplastic polyimide resin. Exemplary diamines usable in combination include m-aminobenzylamine, p-aminobenzylamine, 3,3'-diaminodiphenyl ether, 3,4'-diaminodiphenyl ether, 4,4'-diaminodiphenyl ether, 3,3'-diaminodiphenyl sulfide, 3,4'-diaminodiphenyl sulfide, 4,4'-diaminodiphenyl sulfide, 3,3'-diaminodiphenylsulfone, 3,4'-diaminodiphenylsulfone, 4,4'-diaminodiphenylsulfone, 3,3'-diaminobenzophenone, 3,4'-diaminobenzophenone, 4,4'-diaminobenzophenone, 1,3-bis(3-aminophenoxy)-benzene, 1,3-bis(4-aminophenoxy)benzene, 1,4-bis(3-aminophenoxy)-benzene, 1,4-bis(4-aminophenoxy)benzene, 2,2-bis[4-(4-aminophenoxy)phenyl]propane, 4,4'-bis(4-aminophenoxy)-biphenyl, 4,4'-bis(4-aminophenoxy)phenyl]ketone, and bis[4-aminophenoxy)phenyl]sulfide, bis[4-(4-amino-phenoxy)phenyl]sulfone. These diamines can be used generally in a proportion not greater than 30 wt. %, preferably 5 wt. % or less.

Examples of the tetracarboxylic diamhydride of the formula (IV) useful in the practice of the above process include ethylenetetracarboxylic dianhydride, butanetetracarboxylic dianhydride, cyclopentanetetracarboxylic dianhydride, pyromellitic dianhydride, 1,1-bis(2,3-dicarboxy-phenyl)ethane dianhydride, bis(2,3-dicarboxyphenyl)methane dianhydride, bis(3,4-dicarboxyphenyl)methane dianhydride, 2,2-bis(3,4-dicarboxyphenyl)propane dianhydride, 2,2-bis(2,3-dicarboxyphenyl)propane dianhydride, 2,2-bis(3,4-dicarboxyphenyl)-1,1,1,3,3,3-hexafluoropropane dianhydride, 2,2-bis(2,3-dicarboxyphenyl)-1,1,1,3,3,3-hexafluoropropane dianhydride, 3,3',4,4'-benzophenone-tetracarboxylic dianhydride, 2,2',3,3'-benzophenone-tetracarboxylic dianhydride, 3,3',4,4'-biphenyltetra-carboxylic dianhydride, 2,2',3,3'-biphenyltetracarboxylic dianhydride, bis(3,4-dicarboxyphenyl)ether dianhydride, bis(2,3-dicarboxyphenyl)ether dianhydride, bis(3,4-dicarboxyphenyl)sulfone dianhydride, 4,4'-(p-phenylene-dioxy)-diphthalic dianhydride, 4,4'-(m-phenylenedioxy)-diphthalic dianhydride, 2,3,6,7-naphthalenetetracarboxylic dianhydride, 1,4,5,8-naphthalenetetracarboxylic dianhydride, 1,2,5,6-naphthalenetetracarboxylic dianhydride, 1,2,3,4-benzenetetracarboxylic dianhydride, 3,4,9,10-perylenetetracarboxylic dianhydride, 2,3,6,7-anthracene-tetracarboxylic dianhydride, and 1,2,7,8-phenanthrene-tetracarboxylic dianhydride. These tetracarboxylic dianhydrides can be used either singly or in combination.

These tetracarboxylic dianhydrides can be used in a proportion of 0.9–1.0 mole per mole of the diamine.

The polyimide resins represented by the formula (II) can each be synthesized by reacting 3,3'-diaminobenzophenone represented by the below-described formula (V) with the corresponding tetracarboxylic dianhydride represented by the formula (IV) and then thermally or chemically imidating the resultant polyamic acid.

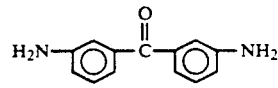

Upon production of each polyimide resin represented by the formula (II), it is preferred to conduct the reaction in the presence of a relative small amount of a dicarboxylic anhydride represented by the following formula (VI):

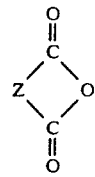

wherein Z is a divalent radical selected from the group consisting of monoaromatic radical, condensed polyaromatic radical, and noncondensed polyaromatic radical wherein aromatic radicals are mutually connected with a bond or a crosslinking function.

The polyimide resins represented by the formula (II) can be produced easily by the process disclosed in Japanese Patent Application No. 167392/1989, etc. In the reaction, the proportion of the tetracarboxylic dianhydride is in a range of 0.9–1.0 mole per mole of the diamine and the proportion of the dicarboxylic anhydride is 0.001–1.0 mole, preferably 0.01–0.2 mole, both, per mole of the diamine.

As tetracarboxylic dianhydrides represented by the formula (IV) and usable for the production of the polyimide resins represented by the formula (II), the above-exemplified compounds can be used equally.

Illustrative of the dicarboxylic anhydride employed in a relatively small proportion include phthalic anhydride, 2,3-benzophenonedicarboxylic anhydride, 3,4-benzophenonedicarboxylic anhydride, 2,3-dicarboxyphenyl phenyl ether anhydride, 3,4-dicarboxyphenyl phenyl ether anhydride, 2,3-biphenyldicarboxylic anhydride, 3,4-biphenyldicarboxylic anhydride, 2,3-dicarboxyphenyl phenyl sulfone anhydride, 3,4-dicarboxyphenyl phenyl sulfone anhydride, 2,3-dicarboxyphenyl phenyl sulfide anhydride, 3,4-dicarboxyphenyl phenyl sulfide anhydride, 1,2-naphthalenedicarboxylic anhydride, 2,3-naphthalene-dicarboxylic anhydride, 1,8- naphthalenedicarboxylic anhydride, 1,2-anthracenedicarboxylic anhydride, 2,3-anthracenedicarboxylic anhydride, and 1,9-anthracenedicarboxylic anhydride. They can be used either singly or in combination.

Upon production of each polyimide resin represented by the formula (I) or (II) and useful in the practice of the invention, another diamine may also be used as a substitute for the above-described diamine in a range not impairing the good properties of the polyimide resin useful in the practice of the invention, for example, in an amount not greater than 30 wt. %, preferably 5 wt. % or less of the diamine.

Exemplary aromatic diamines which can be used partially as a substitute include m-phenylenediamine, o-phenylenediamine, p-phenylenediamine, m-aminobenzylamine, p-aminobenzylamine, bis(3-aminophenyl) ether, (3-aminophenyl) (4-aminophenyl) ether, bis(4-aminophenyl) ether, bis(3-aminophenyl) sulfide, (3-aminophenyl) (4-aminophenyl) sulfide, bis(4-aminophenyl) sulfide, bis(3-aminophenyl) sulfoxide, (3-aminophenyl) (4-aminophenyl) sulfoxide, bis(4-aminophenyl) sulfoxide, bis(3-amino-phenyl) sulfone, (3-aminophenyl) (4-aminophenyl) sulfone, bis(4-aminophenyl) sulfone, 3,4'-diaminobenzophenone, 4,4'-diaminobenzophenone, bis[4-(4-aminophenoxy)phenyl]methane, 1,1-bis[4-(4-aminophenoxy)phenyl]ethane, 1,2-bis[4-(4-aminophenoxy)phenyl]ethane, 2,2-bis[4-(4-amino-phenoxy)phenyl]propane, 2,2-bis[4-(4-aminophenoxy)phenyl]-butane, 2,2-bis[4-(4-aminophenoxy)phenyl]-1,1,1,3,3,3-hexafluoropropane, 1,3-bis(3-aminophenoxy)benzene, 1,3-bis(4-aminophenoxy)benzene, 1,4-bis(3-aminophenoxy)-benzene, 1,4-bis(4-aminophenoxy)benzene, 4,4'-bis(4-aminophenoxy)biphenyl, bis[4-(4-aminophenoxy)phenyl]ketone, bis[4-(4-aminophenoxy)phenyl]sulfide, bis[4-(4-aminophenoxy)phenyl]sulfoxide, bis[4-(4-aminophenoxy)-phenyl] sulfone, bis[4-(3-aminophenoxy)phenyl]ether, bis[4-(4-aminophenoxy)phenyl] ether, 1,4-bis[4-(3-aminophenoxy)benzoyl]benzene, 1,3-bis[4-(3-aminophenoxy)benzoyl]benzene, bis[4-(3-aminophenoxy)phenyl]methane, 1,1-bis[4-(3-aminophenoxy)phenyl]ethane, 2,2-bis[4-(3-aminophenoxy)phenyl]propane, 2-[4-(3-aminophenoxy)phenyl]-2- -[4-(3-aminophenoxy)-3-methylphenyl]propane, 2,2-bis[4-(3-aminophenoxy)-3-methylphenyl]propane, 2-[4-(3-amino-phenoxy)phenyl]-2-[4-(3-aminophenoxy)-3,5-dimethylphenyl]-propane, 2,2-bis[4-(3-aminophenoxy)-3,5-dimethylphenyl]-propane, 2,2-bis[4-(3-aminophenoxy)phenyl]butane, 2,2-bis[4-(3-aminophenoxy)phenyl-1,1,1,3,3,3-hexafluoro-propane, 4,4'-bis(3-aminophenoxy)biphenyl, 4,4'-bis(3-aminophenoxy)-3-methylbiphenyl, 4,4'-bis(3-aminophenoxy)-3,3'-dimethylbiphenyl, 4,4'-bis(3-aminophenoxy)-3,5'-dimethylbiphenyl, 4,4'-bis(3-aminophenoxy)-3,3',5,5'-tetramethylbiphenyl, 4,4'-bis(3-aminophenoxy)-3,3'-dichlorobiphenyl, 4,4'-bis(3-aminophenoxy)-3,5'-dichloro-biphenyl, 4,4'-bis(3-aminophenoxy)-3,3',5,5'-tetrachloro-biphenyl, 4,4'-bis(3-aminophenoxy)-3,3'-dibromobiphenyl, 4,4'-bis(3-aminophenoxy)-3,5-dibromobiphenyl, 4,4'-bis(3-aminophenoxy)-3,3',5,5'-tetrabromobiphenyl, bis[4-(3-aminophenoxy)phenyl]ketone, bis[4-(3-aminophenoxy)phenyl]sulfide, bis[4-(3-aminophenoxy)-3-methoxyphenyl]sulfide, [4-(3-aminophenoxy)phenyl] [4-(3-aminophenoxy)-3,5dimethoxyphenyl] sulfide, and bis[4-(3-aminophenoxy)-3,5-dimethoxyphenyl] sulfide, and bis[4-(3-aminophenoxy)-phenyl] sulfone.

The aromatic polysulfone resin employed as a binder to coat the surfaces of the carbon fibers in the present invention is a linear polymer having arylene bonds, ether bonds and sulfone bonds as bonding units. For example, those having structural units as shown by the following formulae respectively are known:

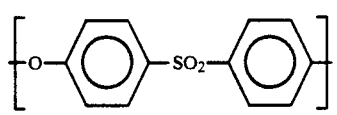

(1)

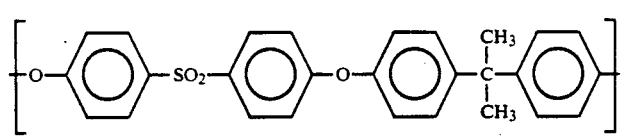

(2)

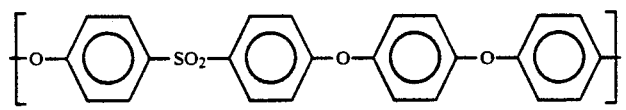

(3)

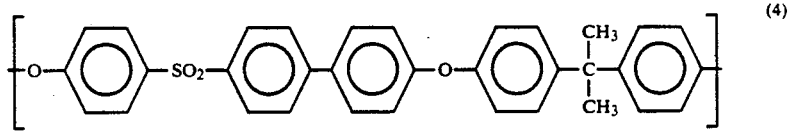

(4)

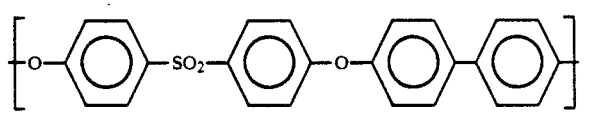

(5)

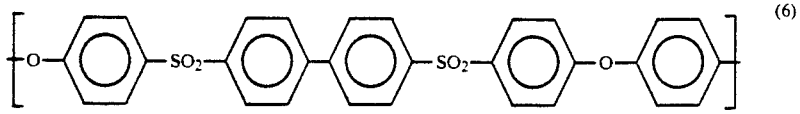

(6)

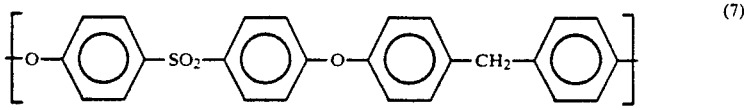

(7)

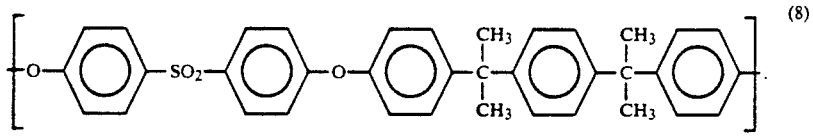

(8)

These aromatic polysulfone resins can be produced, for example, by the process described in Japanese Patent Publication No. 10067/1965, 7799/1967 or 617/1972. At least one of the aromatic polysulfone resins is used.

For example, the polymer (1) can be obtained in the following manner. Dichlorodiphenyl sulfone, an aqueous solution of sodium sulfide, and dimethyl sulfoxide are stirred at 150° C. for 5 hours in an atmosphere of $N_2$. Benzene is then added to azeotropically remove all water. After benzene is removed by distillation, the remaining mixture is heated at 170° C. for 7 hours under stirring so that the polymer is obtained.

The polymer (2) can be synthesized by neutralizing bisphenol A with KOH in benzene and DMSO as solvents in an atmosphere of $N_2$, removing the resulting water azeotropically with benzene to prepare a DMSO solution of the potassium salt of bisphenol A, said solution being absolutely free of water, adding 4,4'-dichlorodiphenyl-sulfone to the solution and then conducting polycondensation at 135° C. for 4-5 hours.

Polysulfone resin represented by the structural unit (1) includes, for example, the resin available on the market under the trade name of "Victrex Polyether Sulfone PES 5003" from Imperial Chemical Industries Limited.

As a representative example of polysulfone resins represented by the structural unit (2), there is "Udel Polysulfone" (trade mark) available from Amoco Chemicals Corporation, U. S. A.

Carbon fibers include acrylic carbon fibers, rayon carbon fibers, lignin carbon fibers, pitch carbon fibers, etc. They are all usable in the present invention. Acrylic carbon fibers most are preferred for use in the present invention because of their highest strength. Carbon fibers may be in any form, for example, in the form of chopped strands, rovings, textile or the like. It is more preferred to subject these carbon fibers to surface oxidation, for example, with ozone or by electrolytic oxidation in advance.

These carbon fibers can be coated with the aromatic polysulfone resin in the following manner. Carbon fibers are dipped in a solution of the aromatic polysulfone resin in a solvent such as dichloromethane, chloroform, 1,2-dichloroethane, 1,1,2,2-tetrachloroethane, dimethylsulfoxide, N-methylpyrrolidone, methyl ethyl ketone or 1,1,2-trichloroethane. The carbon fibers thus dipped are then dried to remove the solvent, thereby obtaining carbon fibers coated with the aromatic polysulfone resin.

As to the amount of the aromatic polysulfone resin coated on the carbon fibers, the aromatic polysulfone resin account for 0.1–10 parts by weight, preferably 0.5–9 parts by weight, notably 1–8 parts by weight per 100 parts by weight of the coated carbon fibers. Coat weights smaller than 0.1 part by weight are too small to bring about the effects of the invention. On the other hand, coat weights greater than 10 parts by weight are meaningless because no additional improvement can be expected of the mechanical strength.

Heat treatment of the carbon fibers coated with the aromatic polysulfone resin as described above is conducted preferably 340°–380° C. in the air. The heating time is 3–20 hours, with 5–15 hours being particularly preferred. Temperatures lower than 300° C. require a long time to bring about the effects of the heat treatment. On the other hand, temperatures higher than 400° C. result in marked heat deterioration of the dipped carbon fibers, thereby making it impossible to obtain desired mechanical characteristics.

Various methods may be used to mix the thus-obtained carbon fibers, which are coated with the aromatic polysulfone resin, with the polyimide resin. For example, the mixing can be achieved by chopping the carbon fibers, which have been coated and then heat-treated, 3–6 mm by 3–6 mm, feeding the thus-chopped carbon fibers and the polyimide resin separately into a melt extruder and then mixing them together. As an alternative, the chopped carbon fibers and the polyimide resin may be pre-blended beforehand in a mixer such as a Henschel mixer, super mixer or ribbon blender and then fed to a melt extruder. As a further alternative, it is also possible to feed carbon fiber rovings, which have been coated and heat-treated, directly to a melt extruder to mix them with the polyimide resin.

Regarding the mixing ratio of the carbon fibers, which have been coated with the aromatic polysulfone resin and then heat-treated, to the polyimide resin as a matrix resin in the present invention, 5–50 parts by weight, preferably 10–50 parts by weight of the carbon fibers are mixed with 95–50 parts by weight, preferably 90–50 parts by weight of the polyimide resin. Amounts of carbon fibers smaller than 5 parts by weight result in resin compositions having low tensile strength and are hence not preferred. When carbon fibers are mixed in an amount greater than 50 parts by weight, the resulting resin composition can hardly be molten and mixed into a uniform mixture and moreover has reduced melt flowability. As a consequence, the resulting resin composition shows impaired moldability, for example, upon injection molding.

In the present invention, the polyimide resin composition may be added, if needed, with a filler such as talc, calcium carbonate, mica or glass beads, a fibrous reinforcing material such as glass fibers, potassium titanate fibers, aramid fibers or ceramic fibers, a stabilizer and a colorant to extents not impairing the quality and performance of the resin composition of the present invention.

The improved resin composition of the present invention, which comprises carbon fibers and the polyimide resin, can be molded or otherwise formed into a desired molded or formed article by a known molding or forming method such as injection molding, extrusion, transfer molding, compression molding or the like. Since the resin composition of the present invention thus molded or otherwise formed is excellent in mechanical strength, especially, in mechanical strength at elevated temperatures, it can be used for machine or car components or parts which are required to have high mechanical strength at elevated temperatures, for example, as gears, cams, bushings, pulleys and sleeves; and also for components or parts of internal combustion engines, for example, as impellers for integral centrifugal compressors, exhaust system components or parts for mufflers, such as manifolds, valve guides, valve stems, piston skirts, oil pans, front covers, rocker covers and the like.

The carbon-fiber-reinforced polyimide resin composition of the present invention is generally furnished in the form of a pellet-like molding material which permits easy handling. Injection molding can be used to shape the molding material into final products. The pelletization can be achieved by using a known single-screw or twin-screw extruder, namely, by kneading and extruding the polyimide resin and carbon fiber strands and then chopping the thus-extruded mixture.

Injection molding of the resultant pellets can be conducted at a cylinder temperature of 360°–420° C. and a mold temperature of 160°–210° C., preferably 180°–200° C. by using a conventional injection molding machine. Components or parts for internal combustion engines, which have complex configurations, for example, impellers for integral centrifugal compressors can also be obtained with ease.

The carbon-fiber-reinforced polyimide resin compositions according to the present invention have excellent mechanical strength and can hence be used widely as materials for parts or components in all industrial fields, for example, in electric and electronic equipment and appliances, machinery, cars, aircraft and space equipment, and general industrial equipment. Accordingly, they are highly valuable from the industrial standpoint.

The present invention will hereinafter be described further by the following synthesis example, examples and comparative examples.

(SYNTHESIS EXAMPLE)

21.8 kg (100 moles) of pyromellitic dianhydride and 38.3 kg of N,N'-dimethylacetamide were charged in a reactor equipped with a stirrer, a reflux condenser and a nitrogen gas inlet tube, followed by the addition of 3.57 kg (9.7 moles) of 4,4'-bis(3-aminophenoxy)biphenyl in portions with care to avoid any excessive increase of the solution temperature. The resultant mixture was stirred at room temperature for about 20 hours.

Then, 2.0 kg (20 moles) of triethylamine and 25.5 kg (250 moles) of acetic anhydride were added dropwise to the solution. Upon an elapsed time of about 1 hour from the completion of the dropwise addition, yellow polyimide powder began to precipitate. The reaction mixture was then stirred at room temperature for 10 hours. After the slurry was filtered off, the polyimide powder was washed with methanol and then dried at 180° C. for 2 hours to obtain 51.1 kg of polyimide powder. The logarithmic viscosity of the polyimide powder was 0.42 dl/g. This logarithmic viscosity is the value obtained by dissolving under heat the polyimide powder at a concentration of 0.5 g/100 ml in a mixed solvent of parachlorophenol and phenol (weight ratio: 90/10), cooling the resultant solution to 35° C. and then measuring the solution thus cooled.

EXAMPLES 1–3

A polyether sulfone solution was prepared, which consisted of 20 wt. % of "Victrex Polyether Sulfone PES 5003P" (trade name; product of Imperial Chemical Industries Limited), 40 wt. % of dichloromethane and 40 wt. % of 1,1,2-trichloroethane. Rovings of "HTA" (trade name for surface-oxidized acrylic carbon fibers produced by TOHO RAYON CO., LTD.; the same carbon fibers were used in the subsequent examples and comparative examples unless otherwise specifically indicated) were continuously dipped at a travelling speed of 60 m/hr in the solution. After the rovings were dried to remove the solvents, they were chopped 3 mm by 3 mm into chopped strands.

The amount of the aromatic polyether sulfone resin adhered on the carbon fibers was 5 wt. % based on the carbon fibers.

The chopped carbon fiber strands were then put in a stainless steel vat and then placed in an electric furnace which was heated at 350° C. In the air atmosphere, heat treatment was conducted for 10 hours.

The chopped carbon fiber strands obtained as described above and the polyimide resin obtained in the Synthesis Example were dry-blended in the proportions shown in Table 1. The resultant blends were separately extruded at an extrusion temperature of 400° C. through an extruder having a cylinder diameter of 40 mm while being molten and kneaded, so that pellet samples, each having a uniform composition, were obtained.

The pellet samples were separately molded at a cylinder temperature of 410° C. and a mold temperature of 200° C. into dumbbell specimens by means of a conventional injection molding machine. The tensile strengths of those dumbbell specimens were measured at a temperature of 23° C. and a pulling rate of 5 mm/min. The results are shown in Table 1.

EXAMPLE 4

A dumbbell specimen of a carbon-fiber-reinforced polyimide resin was prepared in a similar manner to Example 2 except that chopped carbon fiber strands coated with the aromatic polyether sulfone resin were put in a stainless steel vat and then placed in an electric furnace heated at 370° C. and heat treatment was conducted for 8 hours in the air atmosphere. The tensile strength of the dumbbell specimen was measured similarly. The results are shown in Table 1.

EXAMPLE 5

Polyimide powder having a logarithmic viscosity of 0.40 dl/g was obtained using 4,4'-bis[4-(3-aminophenoxy)-phenyl]sulfide [component (III)] and 3,3',4,4'-biphenyl-tetracarboxylic dianhydride [component (IV)] as raw materials.

After the heat-treated and chopped carbon fiber strands obtained in Example 1 were dry-blended with the polyimide powder in the proportions given in Table 1, the resultant blend was extruded at an extrusion temperature of 400° C. through an extruder having a cylinder diameter of 40 mm while being molten and kneaded, so that pellets of a uniform composition were obtained.

The pellets of the uniform composition were molded at a cylinder temperature of 410° C. and a mold temperature of 200° C. into a dumbbell specimen by means of a conventional injection molding machine. The tensile strength of the dumbbell specimen was measured at a temperature of 23° C. and a pulling rate of 5 mm/min. The results are shown in Table 1.

COMPARATIVE EXAMPLES 1–3

Dumbbell specimens of carbon-fiber-reinforced polyimide resins were prepared in a similar manner to Examples 1–3 except that acrylic carbon fibers bound with an epoxy resin and not heat treated were used in place of the chopped carbon fiber strands coated with the aromatic polyether sulfone resin and then heat treated. The tensile strengths of the dumbbell specimens were measured similarly. The results are shown in Table. 1.

COMPARATIVE EXAMPLES 4–6

Dumbbell specimens of carbon-fiber-reinforced polyimide resins were prepared in a similar manner to Examples 1–3 except that acrylic carbon fibers bound with an aromatic polyether sulfone resin and not heat treated were used in place of the chopped carbon fiber strands coated with the aromatic polyether sulfone resin and then heat treated. The tensile strengths of the dumbbell specimens were measured similarly. The results are shown in Table 1.

COMPARATIVE EXAMPLE 7

The procedure of Example 1 was conducted similarly except that the chopped carbon fiber strands coated with the aromatic polyether sulfone resin and heat-treated were dry-blended with the polyimide resin in the proportions shown in Table 1 and the resultant blend was extruded at an extrusion temperature of 410° C. through an extruder having a cylinder diameter of 40 mm while being molten and kneaded. The composition showed poor pliant ductility upon its advancement to a feeding section of the extruder, and marked surging was also observed.

The melt flowability of the resultant pellets was so poor that no dumbbell specimen was successfully prepared by injection molding.

COMPARATIVE EXAMPLE 8

Following the procedure of Example 1, the chopped carbon fiber strands coated with the aromatic polyether sulfone resin and heat-treated were dry-blended with the polyimide resin in the proportions shown in Table 1 and the resultant blend was extruded at an extrusion temperature of 400° C. through an extruder having a cylinder diameter of 40 mm while being molten and kneaded, whereby pellets of a uniform composition were obtained. The pellets of the uniform composition were then molded at a cylinder temperature of 410° C. and a mold temperature of 200° C. into a dumbbell specimen by means of a conventional injection molding machine. The tensile strength of the dumbbell specimen was measured at a temperature of 23° C. and a pulling rate of 5 mm/min. The results are shown in Table 1.

TABLE 1

| | Composition | | | | |
| --- | --- | --- | --- | --- | --- |
| | Polyimide resin | Carbon fibers | | | Tensile strength (kg/cm²) |
| | Proportion (wt. %) | Binder | Heat treatment (°C./hr) | Proportion (wt. %) | |
| Example | | | | | |
| 1 | 80 | PES | 350/10 | 20 | 2270 |
| 2 | 70 | PES | 350/10 | 30 | 2640 |
| 3 | 60 | PES | 350/10 | 40 | 2960 |
| 4 | 70 | PES | 370/8 | 30 | 2660 |
| 5 | 70 | PES | 370/10 | 30 | 2600 |
| Comparative Example | | | | | |
| 1 | 80 | Epoxy resin | — | 20 | 1880 |
| 2 | 70 | Epoxy resin | — | 30 | 2060 |
| 3 | 60 | Epoxy resin | — | 40 | 2200 |
| 4 | 80 | PES | — | 20 | 1900 |
| 5 | 70 | PES | — | 30 | 2110 |
| 6 | 60 | PES | — | 40 | 2250 |
| 7 | 40 | PES | 350/10 | 60 | Not molded |
| 8 | 98 | PES | 350/10 | 2 | 1020 |

EXAMPLES 6–8

Polyimide powder having a logarithmic viscosity of 0.46 dl/g was obtained using 10 moles of 3,3'-diaminobenzophenone [component (V)], 9.7 moles of 3,3',4,4'-benzophenonetetracarboxylic dianhydride [component (IV)] and 1.5 moles of phthalic anhydride [component (VI)] as raw materials.

A polyether sulfone solution was prepared, which consisted of 20 wt. % of "Victrex Polyether Sulfone PES 5003P" (trade name; product of Imperial Chemical Industries Limited), 40 wt. % of dichloromethane and 40 wt. % of 1,1,2-trichloroethane. Rovings of "HTA" (trade name for surface-oxidized acrylic carbon fibers produced by TOHO RAYON CO., LTD.) were continuously dipped at a travelling speed of 60 m/hr in the solution. After the rovings were dried to remove the solvents, they were chopped 3 mm by 3 mm into chopped strands.

The amount of the aromatic polyether sulfone resin adhered on the carbon fibers was 5 wt. % based on the carbon fibers.

The chopped carbon fiber strands were then put in a stainless steel vat and then placed in an electric furnace which was heated at 350° C. In the air atmosphere, heat treatment was conducted for 10 hours.

The chopped carbon fiber strands obtained as described above and the polyimide resin obtained above were dry-blended in the proportions shown in Table 2. The resultant blends were separately extruded at an extrusion temperature of 360° C. through an extruder having a cylinder diameter of 40 mm while being molten and kneaded, so that pellet samples, each having a uniform composition, were obtained.

The pellet samples were separately molded at a cylinder temperature of 380° C. and a mold temperature of 180° C. into dumbbell specimens by means of a conventional injection molding machine. The tensile strengths of those dumbbell specimens were measured at a temperature of 23° C. and a pulling rate of 5 mm/min. The results are shown in Table 2.

EXAMPLE 9

A dumbbell specimen of a carbon-fiber-reinforced polyimide resin was prepared in a similar manner to Example 7 except that chopped carbon fiber strands coated with the aromatic polyether sulfone resin were put in a stainless steel vat and then placed in an electric furnace heated at 370° C. and heat treatment was conducted for 8 hours in the air atmosphere. The tensile strength of the dumbbell specimen was measured similarly. The results are shown in Table 2.

EXAMPLE 10

Polyimide powder having a logarithmic viscosity of 0.50 dl/g was obtained using 3,3'-diaminobenzophenone [component (V)], 3,3',4,4'-biphenyltetracarboxylic dianhydride [component (IV)] and 3,4-benzophenonedicarboxylic dianhydride [component (VI)] as raw materials.

After the heat-treated and chopped carbon fiber strands obtained in Example 6 were dry-blended with the polyimide powder in the proportions given in Table 2, the resultant blend was extruded at an extrusion temperature of 370° C. through an extruder having a cylinder diameter of 40 mm while being molten and kneaded, so that pellets of a uniform composition were obtained.

The pellets of the uniform composition were molded at a cylinder temperature of 390° C. and a mold temperature of 180° C. into a dumbbell specimen by means of a conventional injection molding machine. The tensile strength of the dumbbell specimen was measured at a temperature of 23° C. and a pulling rate of 5 mm/min. The results are shown in Table 2.

COMPARATIVE EXAMPLES 9-11

Dumbbell specimens of carbon-fiber-reinforced polyimide resins were prepared in a similar manner to Examples 6-8 except that acrylic carbon fibers bound with an epoxy resin and not heat treated were used in place of the chopped carbon fiber strands coated with the aromatic polyether sulfone resin and then heat treated. The tensile strengths of the dumbbell specimens were measured similarly. The results are shown in Table 2.

COMPARATIVE EXAMPLES 12-14

Dumbbell specimens of carbon-fiber-reinforced polyimide resins were prepared in a similar manner to Examples 6-8 except that acrylic carbon fibers bound with an aromatic polyether sulfone resin and not heat treated were used in place of the chopped carbon fiber strands coated with the aromatic polyether sulfone resin and then heat treated. The tensile strengths of the dumbbell specimens were measured similarly. The results are shown in Table 2.

COMPARATIVE EXAMPLE 15

The procedure of Example 6 was conducted similarly except that the chopped carbon fiber strands coated with the aromatic polyether sulfone resin and heat-treated were dry-blended with the polyimide resin in the proportions shown in Table 2 and the resultant blend was extruded at an extrusion temperature of 390° C. through an extruder having a cylinder diameter of 40 mm while being molten and kneaded. The composition showed poor pliant ductility upon its advancement to a feeding section of the extruder, and marked surging was also observed.

The melt flowability of the resultant pellets was so poor that no dumbbell specimen was successfully prepared by injection molding.

COMPARATIVE EXAMPLE 16

Following the procedure of Example 6, the chopped carbon fiber strands coated with the aromatic polyether sulfone resin and heat-treated were dry-blended with the polyimide resin in the proportions shown in Table 2 and the resultant blend was extruded at an extrusion temperature of 350° C. through an extruder having a cylinder diameter of 40 mm while being molten and kneaded, whereby pellets of a uniform composition were obtained.

The pellets of the uniform composition were then molded at a cylinder temperature of 370° C. and a mold temperature of 170° C. into a dumbbell specimen by means of a conventional injection molding machine. The tensile strength of the dumbbell specimen was measured at a temperature of 23° C. and a pulling rate of 5 mm/min. The results are shown in Table 2.

TABLE 2

| | Composition | | | | |
| | Polyimide resin | Carbon fibers | | | |
| | Proportion (wt. %) | Binder | Heat treatment (°C./hr) | Proportion (wt. %) | Tensile strength (kg/cm²) |
|---|---|---|---|---|---|
| Example | | | | | |
| 6 | 80 | PES | 350/10 | 20 | 2350 |
| 7 | 70 | PES | 350/10 | 30 | 2720 |
| 8 | 60 | PES | 350/10 | 40 | 2990 |
| 9 | 70 | PES | 370/8 | 30 | 2680 |
| 10 | 70 | PES | 350/10 | 30 | 2700 |
| Comparative Example | | | | | |
| 9 | 80 | Epoxy resin | — | 20 | 1930 |
| 10 | 70 | Epoxy resin | — | 30 | 2100 |
| 11 | 60 | Epoxy resin | — | 40 | 2270 |
| 12 | 80 | PES | — | 20 | 1980 |
| 13 | 70 | PES | — | 30 | 2200 |
| 14 | 60 | PES | — | 40 | 2320 |
| 15 | 40 | PES | 350/10 | 60 | Not molded |
| 16 | 98 | PES | 350/10 | 2 | 1060 |

We claim:

1. A carbon-fiber-reinforced polyimide resin composition comprising:

5-50 parts by weight of carbon fibers obtained by coating starting carbon fibers at surfaces thereof with an aromatic polysulfone resin and then heating the thus-coated carbon fibers at 300°-400° C.; and 95-50 parts by weight of at least one thermoplastic polyimide resin having the following formulae (I) or (II):

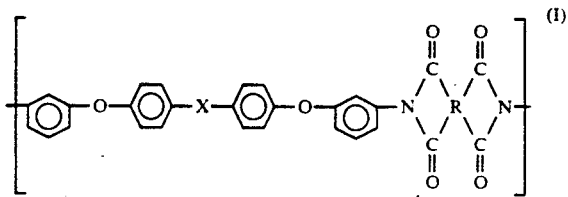

wherein X is a radical selected from the group consisting of a direct bond, a divalent hydrocarbon having 1 to 10 carbons, hexafluorinated isopropylidene, carbonyl, thio, sulfinyl, sulfonyl and oxide, and R is a tetra-valent radical selected from the group consisting of aliphatic radical having 2 or more carbons, cyclo-aliphatic radical, monoaromatic radical, condensed polyaromatic radical, and noncondensed polyaromatic radical wherein aromatic radicals are mutually connected with a direct bond or a crosslinking function.

2. The composition of claim 1, wherein the aromatic polysulfone resin is selected from the group consisting of aromatic polysulfone resins having the following recurring units (1)-(8), respectively:

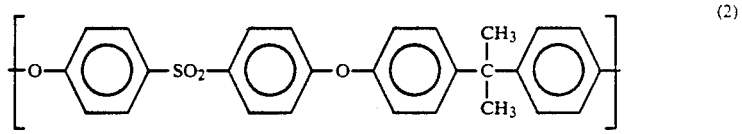

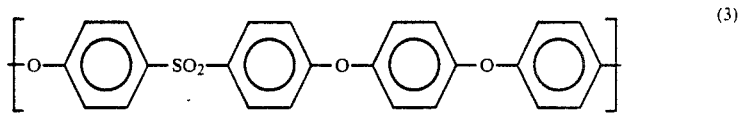

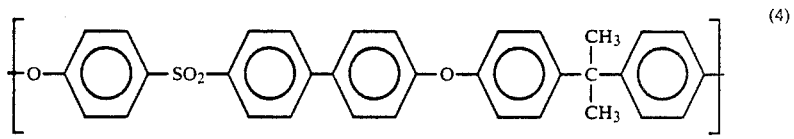

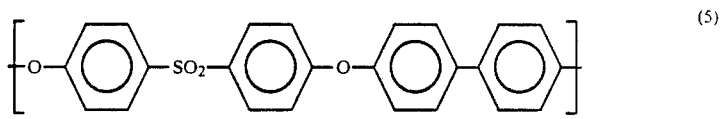

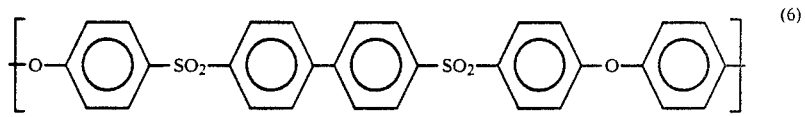

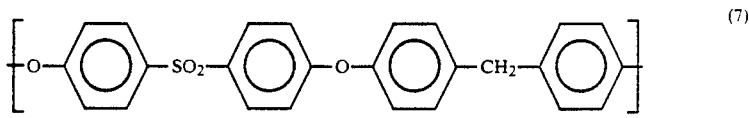

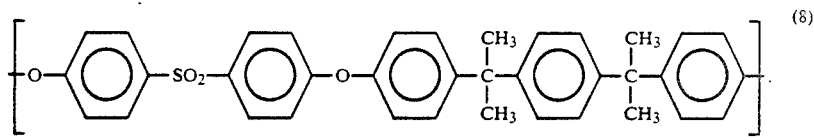

3. The composition of claim 1, wherein the carbon fibers have been obtained by coating the starting carbon fibers with 0.1-10 parts by weight of the aromatic polysulfone resin per 100 parts by weight of the starting carbon fibers.

4. The composition of claim 1, wherein the carbon fibers have been obtained by heating the coated starting carbon fibers at 300°-400° C. for 3-20 hours.

5. The composition of claim 1, wherein the polyimide resin has been obtained by dehydrating and cyclizing a polyamic acid obtained by reacting an ether diamine represented by the following formula (III):

(The above paragraph "noncondensed polyaromatic radical wherein aromatic radicals are mutually connected with a direct bond or a crosslinking function," precedes formula (II):)

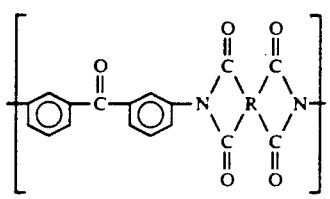

(II)

wherein R is a tetra-valent radical selected from the group consisting of aliphatic radical having 2 and more carbons, cyclo-aliphatic radical,

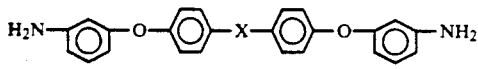

wherein X is a radical selected from the group consisting of a direct bond, a divalent hydrocarbon having 1 to 10 carbons, hexafluorinated isopropylidene, carbonyl, thio, sulfinyl, sulfonyl and oxide, with a tetracarboxylic dianhydride represented by the following formula (IV):

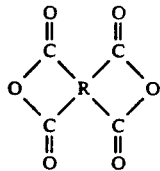

wherein R is a tetra-valent radical selected from the group consisting of aliphatic radical having 2 and more carbons, cyclo-aliphatic radical, monoaromatic radical, condensed polyaromatic radical, and noncondensed polyaromatic radical wherein aromatic radicals are mutually connected with a direct bond or a crosslinking function.

6. The composition of claim 1, wherein the polyimide resin has been obtained by reacting 3,3'-diaminobenzophenone represented by the following formula (V):

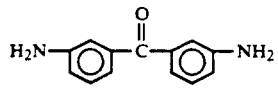

with a tetracarboxylic dianhydride represented by the following formula (IV):

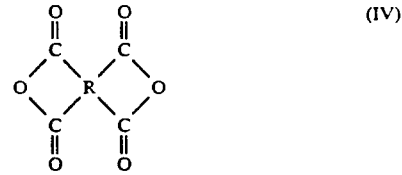

wherein R is a tetra-valent radical selected from the group consisting of aliphatic radical having 2 and more carbons, cyclo-aliphatic radical, monoaromatic radical, condensed polyaromatic radical, and noncondensed polyaromatic radical wherein aromatic radicals are mutually connected with a direct bond or a crosslinking function, in the presence of a dicarboxylic anhydride represented by the following formula (VI):

wherein Z is a divalent radical selected from the group consisting of monoaromatic radical, condensed polyaromatic radical, and noncondensed polyaromatic radical wherein aromatic radicals are mutually connected with a direct bond or a crosslinking function.

7. The composition of claim 6, wherein the dicarboxylic anhydride is used in a range of 0.01-0.2 mole per mole of the diamine.

* * * * *